Dec. 16, 1930.　　　　　B. CARLIN　　　　1,785,179
EQUALIZING SYSTEM FOR FOUR-WHEEL BRAKES
Filed July 18, 1928　　　4 Sheets-Sheet 1
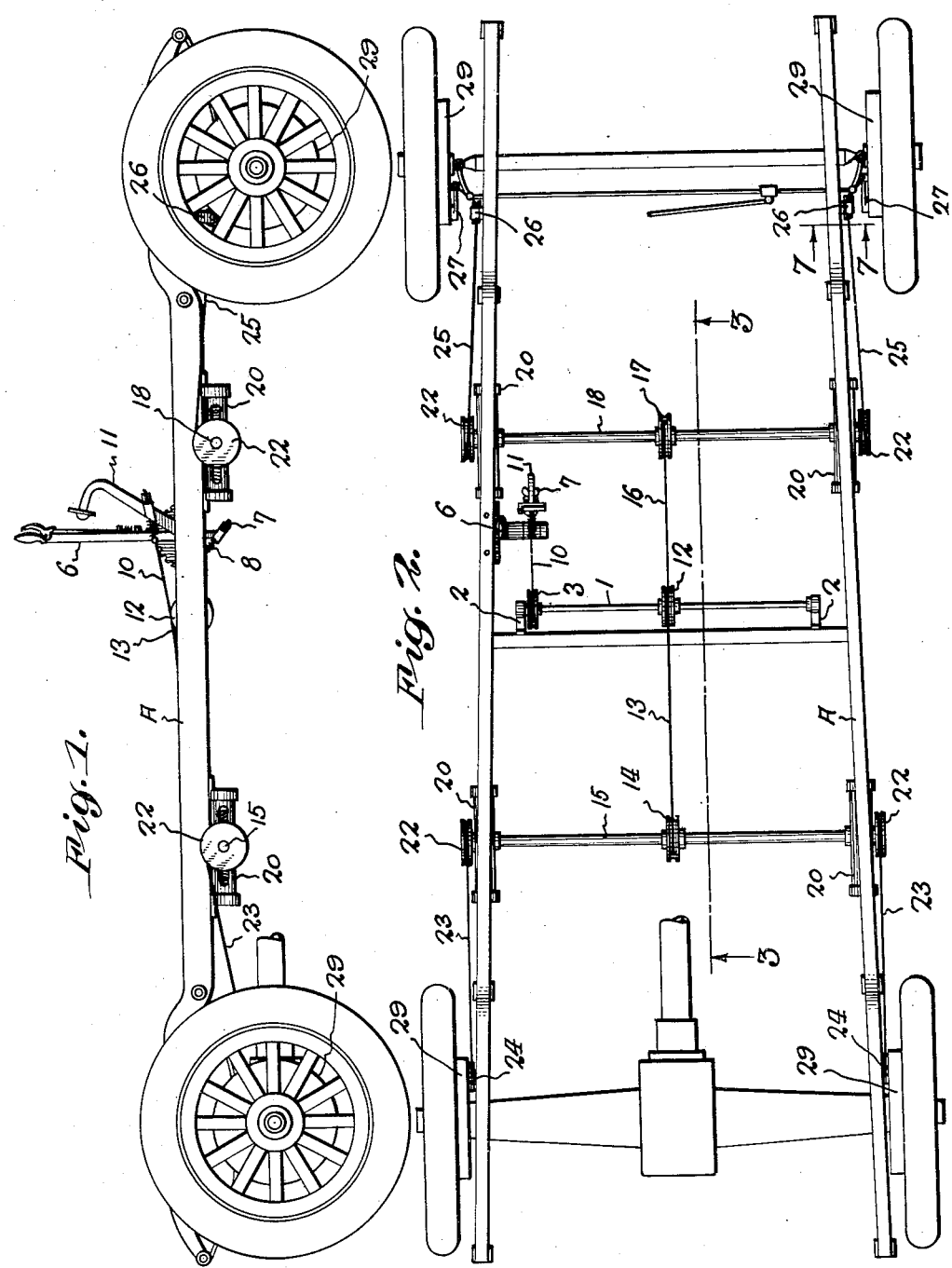
Bernard Carlin
INVENTOR
BY Victor J. Evans
ATTORNEY Dec. 16, 1930.  B. CARLIN  1,785,179
EQUALIZING SYSTEM FOR FOUR-WHEEL BRAKES
Filed July 18, 1928  4 Sheets-Sheet 2
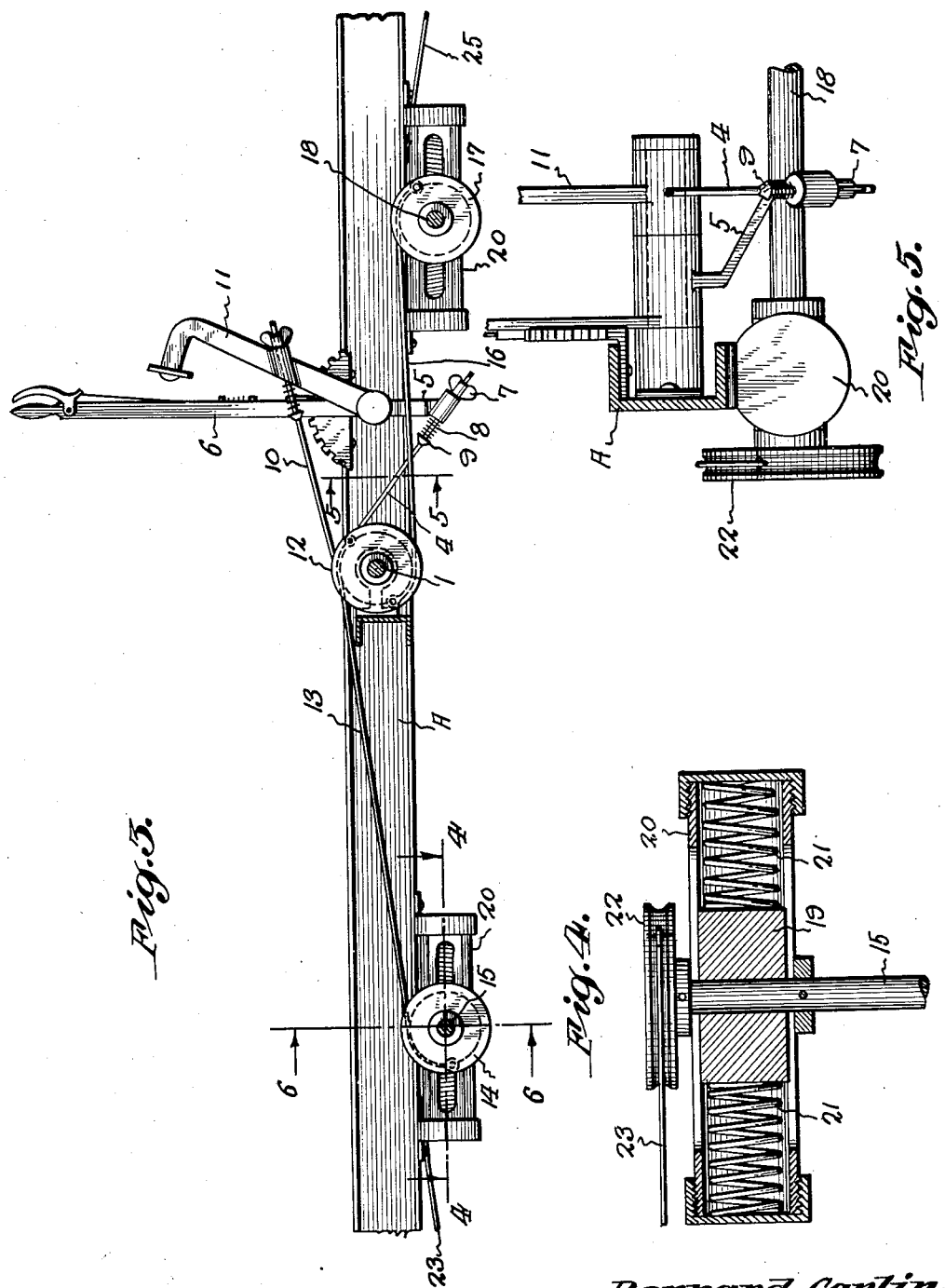
Bernard Carlin,
INVENTOR
BY Victor J. Evans
ATTORNEY

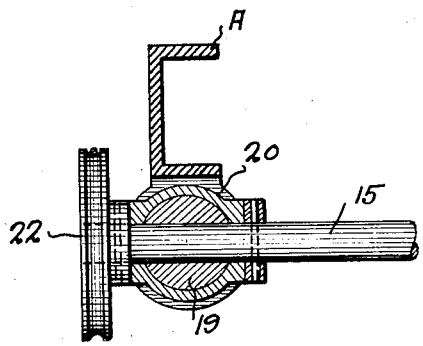
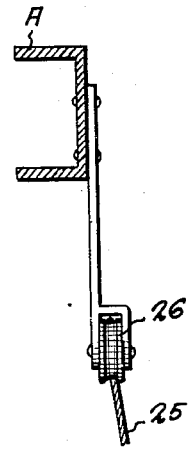
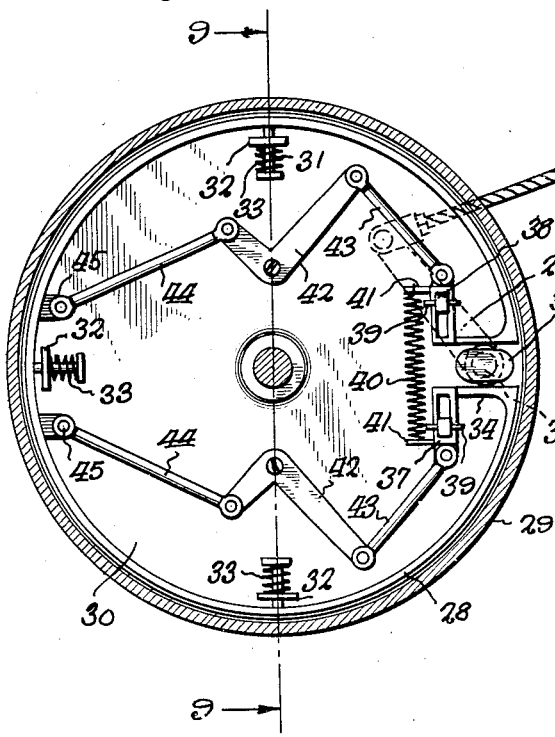
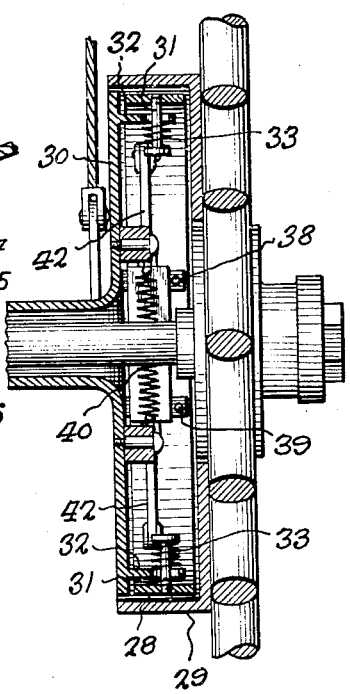

Dec. 16, 1930.  B. CARLIN  1,785,179
EQUALIZING SYSTEM FOR FOUR-WHEEL BRAKES
Filed July 18, 1928  4 Sheets-Sheet 4

Bernard Carlin,
INVENTOR
BY Victor J. Evans
ATTORNEY

Patented Dec. 16, 1930

1,785,179

UNITED STATES PATENT OFFICE

BERNARD CARLIN, OF PENSACOLA, FLORIDA

EQUALIZING SYSTEM FOR FOUR-WHEEL BRAKES

Application filed July 18, 1928. Serial No. 293,533.

This invention relates to an equalizing system for four wheel brakes, the general object of the invention being to provide a shaft rotated by a foot pedal or a hand lever or both, with a shaft connected with the brakes of each pair of wheels of a vehicle and yieldably held against bodily movement toward and away from the wheels, with means for connecting the last mentioned shafts with the first mentioned shaft so that when the first mentioned shaft is partly rotated by the manual means, the other two shafts will be partly rotated to apply the brakes, the yieldable supporting means for the two shafts permitting the parts to adjust themselves to equalize the brakes.

Another object of the invention is to provide novel means for expanding and contracting the brake bands so as to secure contact of the band with the drum over all portions of the band.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of a chassis of a motor vehicle, showing the invention in use.

Figure 2 is a plan view of Figure 1.

Figure 3 is a section on line 3—3 of Figure 2.

Figure 4 is a section on line 4—4 of Figure 3.

Figure 5 is a section on line 5—5 of Figure 3.

Figure 6 is a section on line 6—6 of Figure 3.

Figure 7 is a section on line 7—7 of Figure 2.

Figure 8 is a view of one of the brake drums and its associated parts.

Figure 9 is a section on line 9—9 of Figure 8.

Figure 10:
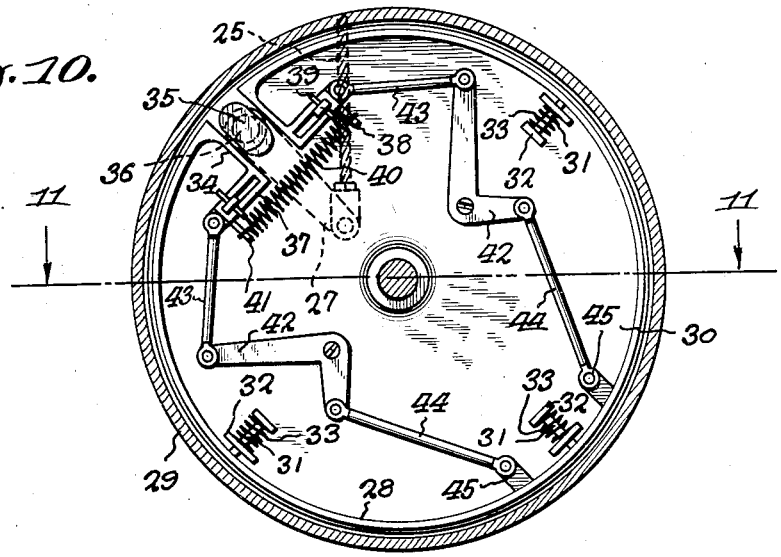
Figure 10 is a view of the braking means for one of the front wheels.

In these drawings, a shaft 1 is journaled in the brackets 2 attached to a part of the chassis A of the vehicle and this shaft has attached thereto the pulley 3. A cable 4 is fastened to a part of the periphery of the pulley and extends around a portion thereof and has its other end attached to the depending part 5 of a hand lever 6 by a nut 7, a spring 8 being arranged between the eye portion of the part 5 through which the cable passes and a shoulder 9 formed on the cable. Thus the cable can be tightened by turning the nut. A second cable 10 connects the pulley with the foot pedal 11, the connection between the cable and the pedal being the same as that for the cable 4 and the lever 6. Thus by depressing the pedal or manipulating the lever, the pulley will be turned and thus the shaft will be partly rotated. The shaft carries a second pulley 12 and a cable 13 connects a portion of this pulley with a portion of a pulley 14 fastened to a shaft 15 arranged in front of the rear axle of the vehicle and a cable 16 connects a part of the pulley 12 with a part of a pulley 17 on a shaft 18 which is arranged in rear of the front axle. Each of the shafts 15 and 18 is journaled in the blocks 19 slidably arranged in the housings 20 which are fastened to the side bars of the chassis and a pair of springs 21 is arranged in each housing and tends to hold each block 19 in its central position. A pulley 22 is fastened to each end of each of the shafts 15 and 18 and a cable 23 is fastened to each of these pulleys.

The cables 23 which are attached to the pulleys 22 of the shaft 15 extend rearwardly and are connected with the arms 24 of the brake means of the rear wheels and a cable 25 is connected to each of the pulleys 22 carried by the shaft 18 and said cable extends forwardly over a guiding pulley 26 and these cables are connected to the arms 27 of the brake means for the front wheels. Thus by depressing the foot pedal 11 or manipulating the lever 6, the shaft 1 will be partly rotated and the rotary movement of this shaft will be communicated to the shafts 18 and 15 so that all four brakes will be applied by the cables 23 and 25. By providing the yieldable means for permitting bodily movement of the shafts 15 and 18, the braking action will be equalized as the shafts 15 and 18 will adjust themselves to the strain exerted by the brakes engaging the drums and thus all the brakes will be applied at practically the same pressure.

The band 28 for each brake drum 29 is of split ring type and is movably supported on the stationary member 30 through means of the headed pins 31 attached to the band and passing through openings formed in the ears 32 carried by the member 30, a spring 33 being arranged on each lug between its head and the member 32 so that these springs tend to hold the band in contracted position. The ends of the band are formed with the inwardly extending parts 34 between which is arranged a cam 35 fastened to the inner end of a stub shaft 36 journaled in the member 30. The arms 24 of the rear brake means are attached to these stub shafts and the arms 27 of the front brake means are attached to the shafts 36 of the front brake means.

Thus when the cables are pulled upon, the arms will cause the stub shafts to revolve so as to cause the cams 35 to force the parts 34 away from each other and thus expand the bands against the drums and apply the brakes. Each part 34 is formed with a slotted rightangle extension 37 through which are carried by the member 30, pins 39 passing through the projections for holding the slotted parts thereon. A spring 40 has its ends connected with projections 41 on the extensions 37 so that this spring tends to move the ends 34 toward each other and thus this spring acts with the springs 33 to hold the brake band in contracted position. A pair of bell cranks 42 is pivotally arranged on the member 30 and one end of each bell crank is connected by a link 44 with an ear 45 on the band adjacent the center thereof so that when the cam 35 moves the ends 34 away from each other, the outward movement of the extensions 37 will cause the links 43 to rock the bell cranks 42 so that pressure is applied to the central portion of the band by the links 44 and thus all portions of the band are pressed against the drum.

Figure 11:
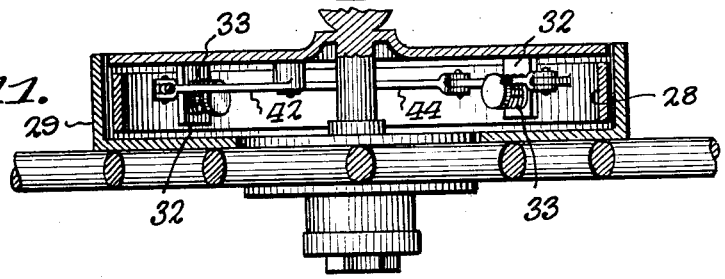
Figure 11 is a section on line 11—11 of Figure 10.

As shown in Figures 10 and 11, the arrangement of the braking means for the front wheels is substantially the same as that for the rear wheels, though the parts are located in different positions from the parts for the rear wheels.

Figure 12:
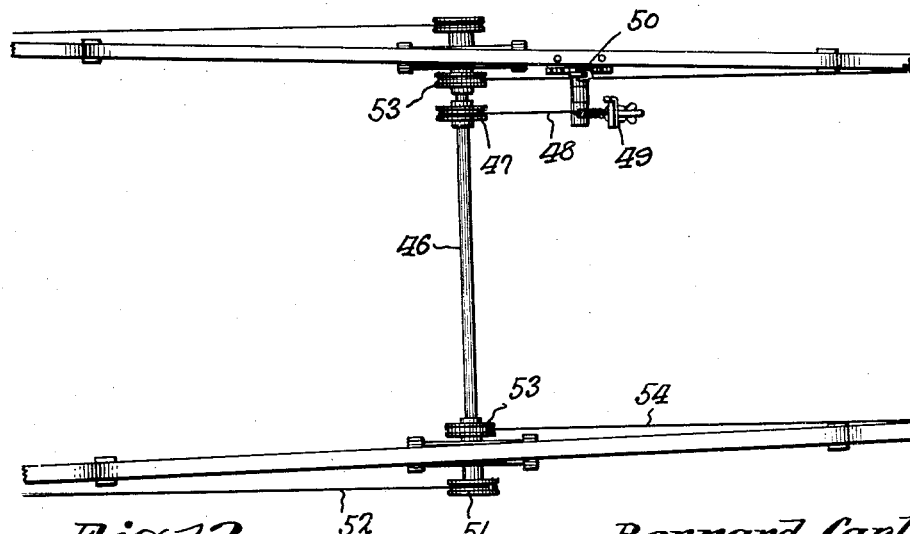
Figure 12 is a plan view showing a modification.

In the modification shown in Figure 12, a single shaft 46 is used instead of the three shafts 1, 15 and 18 before described, this shaft carrying a pulley 47 which is connected by a cable 48 with the foot pedal 49 and the hand lever 50. A pulley 51 is connected to each end of the shaft and these pulleys are connected by the cables 52 with the brake means of the rear wheels. The shaft also carries a pair of pulleys 53 and these pulleys are connected by the cables 54 with the brake means of the front wheels. This shaft is yieldably supported in the same manner as are the shafts 15 and 18. This arrangement, while not as effective as the first arrangement, is much simpler.

Thus it will be seen that I have provided simple means for applying the brakes of all four wheels of the vehicle, with means for equalizing the pressure with which the bands engage the drums, with novel means for fully expanding the bands against the drums.

It will also be seen that all the brakes can be adjusted by a turning movement of either one or both of the nuts 7 which connect the threaded portions of the members 4 and 10 to the foot pedal 11 and the hand lever 6 so that but a single adjustment is necessary to take up slack in all the connecting members of the four brakes.

It is thought from the foregoing description that the advantages and novel features of my invention will be readily apparent.

It is to be understood that changes may be made in the construction and in the combination and arrangement of the several parts, provided that such changes fall within the scope of the appended claims.

What I claim is:—

1. In a vehicle, two pairs of longitudinally extending housings connected with the vehicle, a block slidably mounted in each housing, spring means in each housing acting to hold the block in its central position, a shaft journaled in each pair of blocks, a pair of pulleys carried by each shaft, flexible means for connecting the pulleys of one shaft with the brake means of the front pair of wheels, flexible means connecting the pulleys of the other shaft with the brake means of the rear pair of wheels, a third shaft journaled in a part of the vehicle, a pulley thereon, a pulley on each of the other shafts, flexible means connecting the pulley on the third shaft with said pulleys on the other shafts, a second pulley on the third shaft and flexible means connecting the same with the foot pedal and brake lever of the vehicle.

2. In combination with a vehicle having braking means associated with each wheel thereof, a pair of shafts, yieldable means for supporting the shafts whereby they can move toward and away from the front and rear axles of the vehicle, means for connecting the shafts with the brake means whereby rotary movement of the shafts will actuate the brake means, a third shaft, manually operated means for rotating the same and means for communicating the movement of the third shaft to the other two shafts.

In testimony whereof I affix my signature.

BERNARD CARLIN.